United States Patent [19]

Yamagata

[11] Patent Number: 4,672,941

[45] Date of Patent: Jun. 16, 1987

[54] IGNITION SYSTEM

[75] Inventor: Tetsuo Yamagata, Tokyo, Japan

[73] Assignee: Honda Giken Kogyo Kabushiki Kaisha, Tokyo, Japan

[21] Appl. No.: 655,947

[22] Filed: Sep. 28, 1984

[30] Foreign Application Priority Data

Sep. 28, 1983 [JP] Japan .................... 58-180018
Sep. 28, 1983 [JP] Japan .................... 58-180019

[51] Int. Cl.⁴ .................... F02P 3/06; F22B 5/02
[52] U.S. Cl. .................... 123/602; 123/198 DC; 123/198 DB; 123/179 B
[58] Field of Search ............ 123/602, 335, 334, 198 F, 123/198 DC, 339, 630, 632, 315, 318, 330, 340, 418, 179 B

[56] References Cited

U.S. PATENT DOCUMENTS

| | | | |
|---|---|---|---|
| 3,872,316 | 3/1975 | Kurii et al. | 123/179 B |
| 4,192,279 | 3/1980 | Maisch et al. | 123/335 |
| 4,193,385 | 3/1980 | Katsumata et al. | 123/198 DC |
| 4,244,336 | 1/1981 | Fitzner | 123/602 |
| 4,286,683 | 9/1981 | Zeigner et al. | 123/179 B |
| 4,292,939 | 10/1981 | Coates et al. | 123/335 |
| 4,312,310 | 1/1982 | Chivilo et al. | 123/198 DB |
| 4,336,778 | 6/1982 | Howard | 123/334 |
| 4,453,506 | 6/1984 | Ueda et al. | 123/198 DC |

Primary Examiner—Raymond A. Nelli
Attorney, Agent, or Firm—Lyon & Lyon

[57] ABSTRACT

There is disclosed herein an ignition system for engines which includes the usual form of ignition circuit which generates an ignition control signal on the basis of timing pulses. There is further included an inhibition circuit connected with the ignition control circuit to inhibit the generation of the spark discharge of a spark plug under certain circumstances, such as in stopping the engine and when the engine RPM is below a predetermined value lower than idle. Furthermore, an embodiment disclosed herein allows improvement of the accuracy of ignition during engine starting.

6 Claims, 10 Drawing Figures

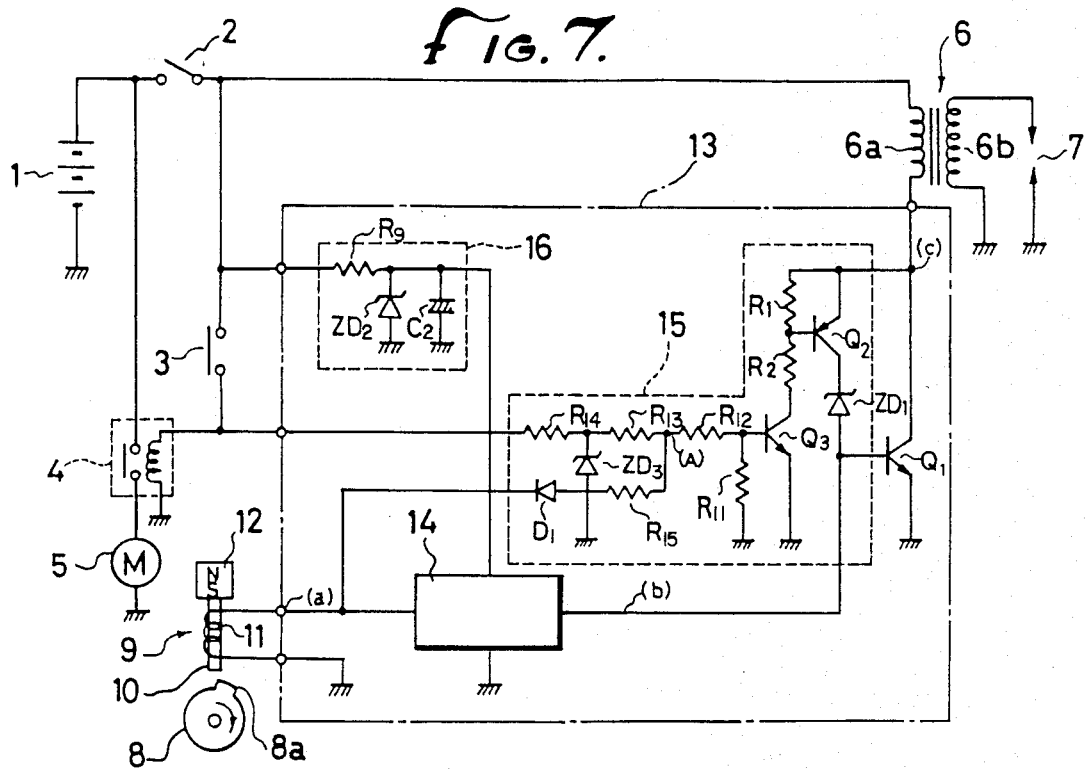
fig. 7.
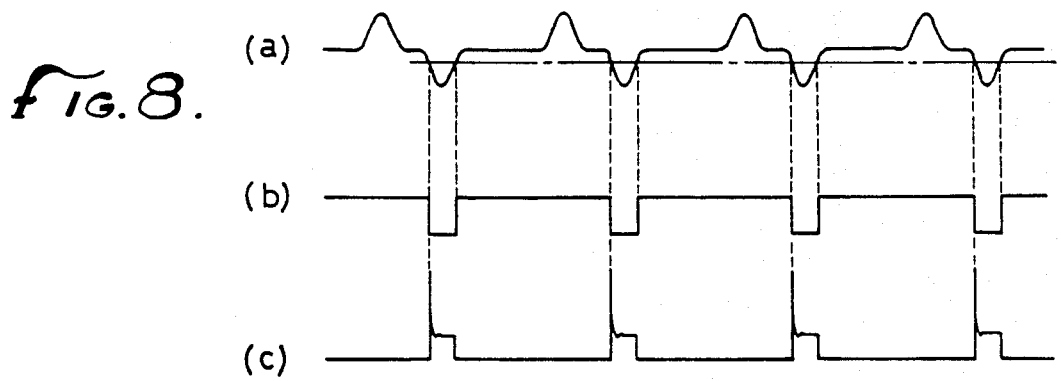
fig. 8.
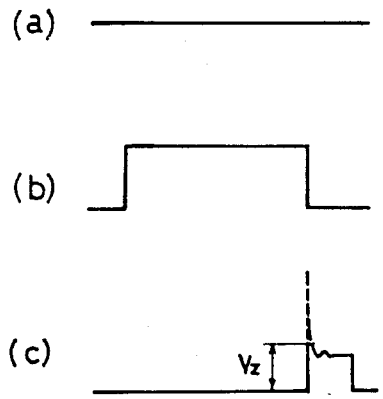
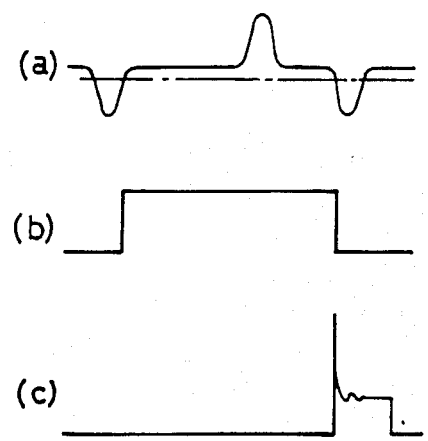

IGNITION SYSTEM

DETAILED DESCRIPTION OF THE INVENTION

The present invention relates to ignition systems.

It has been known heretofore that when, directly before stopping an engine, ignition takes place before the upper dead center, then as the engine rotation lowers to the extent that the engine stops under working conditions of the ignition system, it is difficult for the engine to pass over the upper dead center and, therefore, the crankshaft acquires uneven rotation and the vehicle shakes while stopping.

It therefore is an object of the present invention to provide an ignition system which minimizes shaking of a vehicle during the stopping of its engine by inhibiting the ignition operation when the engine rotates at an extremely low speed.

An ignition system according to the present invention is constructed so that when the revolutions of the engine are below a predetermined number which is lower than the idle speed of the engine, the spark discharge on an ignition plug (spark plug) is inhibited irrespective of the generation of an ignition control signal.

Furthermore, when, in a conventional ignition system, the engine is started with batteries having low capacity, the system cannot provide appropriate timing at starting, since along with the demand for high starting current at a starter motor, the voltage on the batteries drops, e.g., by 4 V, and the ignition control circuit, which generates an ignition control signal on the basis of a synchronizing signal synchronized with the rotation of the engine, loses its accuracy.

It therefore is a further object of the present invention to provide an ignition system which allows improvement of the accuracy of ignition at the time of engine starting due to an appropriate ignition timing from the initial state of starting.

The ignition system of this latter embodiment of the present invention is made so that irrespective of the generation of a synchronizing signal, which is synchronized with the engine rotation at a specified period of the engine starting time, it suppresses the generation of the ignition control signal and inhibits the spark discharge on the spark plug.

The invention will be explained further in detail with reference to accompanying drawings.

BRIEF DESCRIPTION OF THE DRAWINGS

FIG. 7 is a circuit made according to a further embodiment of the present invention;

FIG. 8 shows various waveforms for the circuit of FIG. 7 during a normal ignition operation;

FIG. 9 shows waveforms used for an explanation of operations of FIG. 7 during the engine start period other than the initial ignition timing; and FIG. 10 shows waveforms used for the explanation of operation of FIG. 7 during the intial ignition timing of the engine start period.

Turning now to FIG. 1, a circuit illustrating a first embodiment of the present invention is shown. This circuit shows a battery 1, a main switch 2, a starter switch 3, a starter relay 4, a starter motor 5, an ignition coil 6, and an ignition plug (spark plug) 7. Reference numeral 8 designates the usual rotor which is made of a ferromagnetic material and is provided with a protrusion 8a. The rotor is connected integrally with a crankshaft of an engine which is not shown in the drawings. The system further includes an electromagnetic pickup 9 which is arranged in the vicinity of rotor 8, and is formed by a pulser coil 11 wound around a magnetic core 10 and is biased by means of a permanent magnet 12. The rotor 8 rotates in the direction of the arrow shown in the drawing, and when its protrusion 8a passes magnetic core 10 of electromagnetic pickup 9, a timing pulse (synchronizing signal) of the waveform shown in FIG. 2 occurs on the output terminal of pulse coil 11. In FIG. 2, a positive timing pulse "a" corresponds to the moment when the front end of protrusion 8a is aligned with magnetic core 10 of electromagnetic pickup 9, while a negative timing pulse "b" corresponds to the moment when the rear end of protrusion 8a is aligned with magnetic core 10. The angluar position of protrusion 8a on rotor 8 and the position of attachment of the rotor to the crankshaft are chosen so that phases of the crankshaft rotation at the time of generation of each timing signal "a" and "b" correspond to the most advanced ignition timing angle (advance completion timing) $\theta a$ and to the most delayed ignition timing angle (starting ignition timing) $\theta b$ as shown in FIG. 3.

Figure 1:
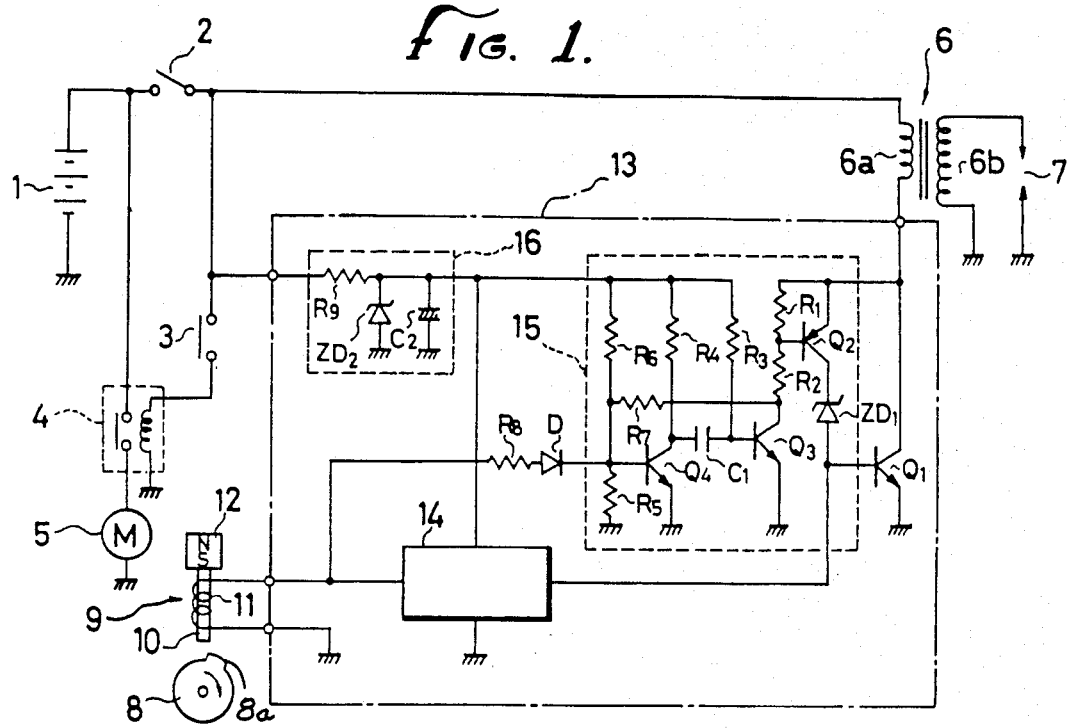
FIG. 1 is a circuit according to one embodiment of the present invention.

Reference numeral 13 designates an ignition circuit. This circuit comprises a conventional ignition control circuit 14 which generates an ignition control signal on the basis of the timing pulses a and b, a power transistor $Q_1$ which is connected in series with a primary winding $6a$ of ignition coil 6 and generates high voltage on a secondary winding $6b$ of ignition coil 6 by being switched off in response to said ignition control signal, and a driving power source unit 16 for said ignition control circuit 14 and inhibition circuit 15. The power source unit 16 comprises a condenser $C_2$ which is charged from the battery voltage through a resistor $R_9$ and a Zener diode $ZD_2$ for charging the condenser $C_2$ to a predetermined voltage.

The circuit 13 further includes, according to the present invention, an inhibit circuit 15 which, irrespective of the generation of the ignition control signal, inhibits the spark discharge on ignition plug 7 at the moment when revolutions of the engine are below a certain number which is lower than the idle speed of the engine.

In inhibit circuit 15, a transistor $Q_2$ and a Zener diode $ZD_1$ are connected in series between the collector and base of a power transistor $Q_1$. Zener diode $ZD_1$ has a Zener voltage Vz, e.g., of 20 V, which is above the output voltage of power source 16 so that it is normally non-conductive. Resistors $R_1$, $R_2$ and a transistor $Q_3$ are connected in series, with the resistor $R_1$ connected between the emitter and base of transistor $Q_2$ and the resistor $R_2$ connected between the base of transistor $Q_2$ and the collector of transistor $Q_3$. The common point of interconnection between resistors $R_1$ and $R_2$ is connected to the base of transistor $Q_2$. The base of transistor $Q_3$ is connected through a resistor $R_3$ to an output terminal of the power source unit 16. One end of a condenser $C_1$ is connected to the base of transistor $Q_3$ while the other end of condenser $C_1$ is connected to the output terminal of power source unit 16 through a resistor $R_4$ and to the collector of a transistor $Q_4$. The emitter of transistor $Q_4$ is grounded, an its base is connected to ground through a resistor $R_5$. The base of the transistor $Q_4$ is connected to an output terminal of power source 16 through a resistor $R_6$ and to the collector of transistor $Q_3$ through a resistor $R_7$. The base of transistor $Q_4$ receives a positive timing pulse (FIG. 2) through a resistor $R_8$ and a diode D.

Figure 4:
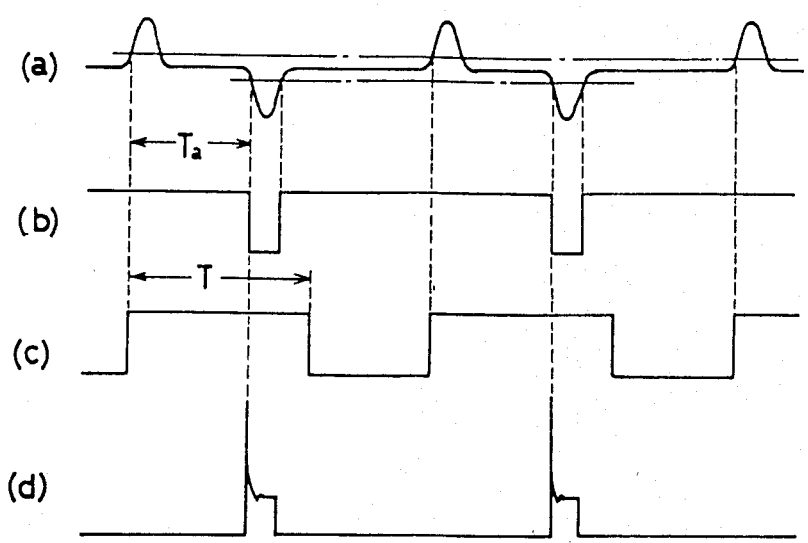
FIGS. 4 and 5 are waveforms used for an explanation of operation of the system shown in FIG. 1.

In the circuit described above, the value of each resistor is set so that transistor $Q_4$ is in the ON condition only when a positive timing pulse "a" is generated. When transistor $Q_4$ is OFF, transistor $Q_3$ is ON, and condenser $C_1$ is charged through resistor $R_4$. When a positive timing pulse "a" is generated, transistor $Q_4$ becomes conductive (ON), and then, with the condenser $C_1$ charged, its positive side is grounded through transistor $Q_4$, and the base of transistor $Q_3$ is biased far in the negative direction thereby causing transistor $Q_3$ to assume the OFF condition. In this state, the charge of condenser $C_1$ is discharged through resistor $R_3$, and the system is maintained unchanged for a time period T until the base voltage of transistor $Q_3$ is returned to the threshold voltage. During this initial period T, the collector voltage of transistor $Q_3$ is increased to a high level as shown by curve (c) in FIGS. 4 and 5. Here the period T is determined by condenser $C_1$ and resistor $R_3$, and when revolutions of the engine comprise a given low value which is below the idle speed of the engine, the period T corresponds to a time interval from the point of generation of a positive timing pulse "a" to the point of generation of a negative timing pulse "b".

The system of the present invention operates in the the following manner.

In the case when revolutions of the engine exceed a certain speed $N_o$ which is below the idle speed of the engine, as shown in FIG. 4(a), the period of time $T_a$ from the moment of generation of a positive timing pulse "a", which is a pulser output signal, to the moment of generation of a negative timing pulse "b", is short as compared to a high level collector voltage FIG. 4(c) of transistor $Q_3$. When the revolutions of the engine increase, this period $T_a$ shortens further, and during the period T transistor $Q_2$ becomes non-conductive, and the ignition control circuit 14 generates an ignition control signal shown in FIG. 4(b) in contrast to a pulser output shown in FIG. 4(a). By means of timing which changes this signal FIG. 4(b) from a high level to a low level, i.e., by means of timing which transfers power transistor $Q_1$ from the ON state to the OFF state, an extremely high counter electromotive force shown in FIG. 4(d) is induced on primary winding 6a of ignition coil 6 so that a high voltage which is a multiple of the turn ratio of primary winding 6a and secondary winding 6b to secondary winding 6b is generated, whereby a spark discharge occurs on ignition plug 7. In this case, the inhibit circuit 15 does not inhibit the spark discharge because the engine speed is above a given value.

Figure 5:
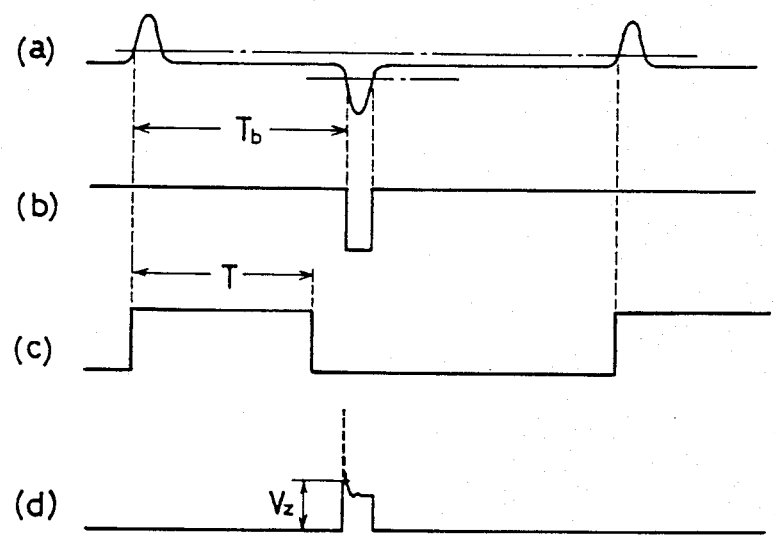

On the other hand, when revolutions of the engine are below the predetermined value $N_o$ as shown in FIG. 5, the period of time $T_b$ from the point of generation of the positive timing pulse at the pulser output "a" to the point of generation of a negative timing pulse "b" is increased (or longer) as compared to a time interval T, which corresonds to the period of a high level of collector voltage FIG. 5(c) of transistor $Q_3$, whereby at the moment of generation of a negative timing pulse, i.e., when the ignition timing transistor $Q_2$ becomes conductive, ignition is prevented. Stated differently, by means of the ignition timing which transfers ignition control signal (b) from a high level to a low level, a counter electromotive force is generated on primary winding 6a of ignition coil 6 due to a non-conductive state of transistor $Q_1$. Since this voltage, however, is returned back to the base of power transistor $Q_1$ through transistor $Q_2$ (which is now on) and Zener diode $ZD_1$, the collector voltage FIG. 5(d) of power transistor $Q_1$, i.e., the primary voltage of ignition coil 6, is almost supressed by Zener voltage Vz of Zener diode $ZD_1$. Therefore the secondary voltage of ignition coil 6 is restricted to a low voltage and the spark discharge does not occur on ignition plug 7.

Since in the course of stopping the engine with the ignition system under working conditions the ignition operation will be automatically prevented, there will be no counter torque transmitted to the crankshaft and the engine will stop in a normal manner. Ignition will be prohibited at extremely low speeds of the engine not only during the stopping time but when the engine is started as well. Therefore, the system prevents halting of the engine by its reversal because of the counter torque.

Figure 6:
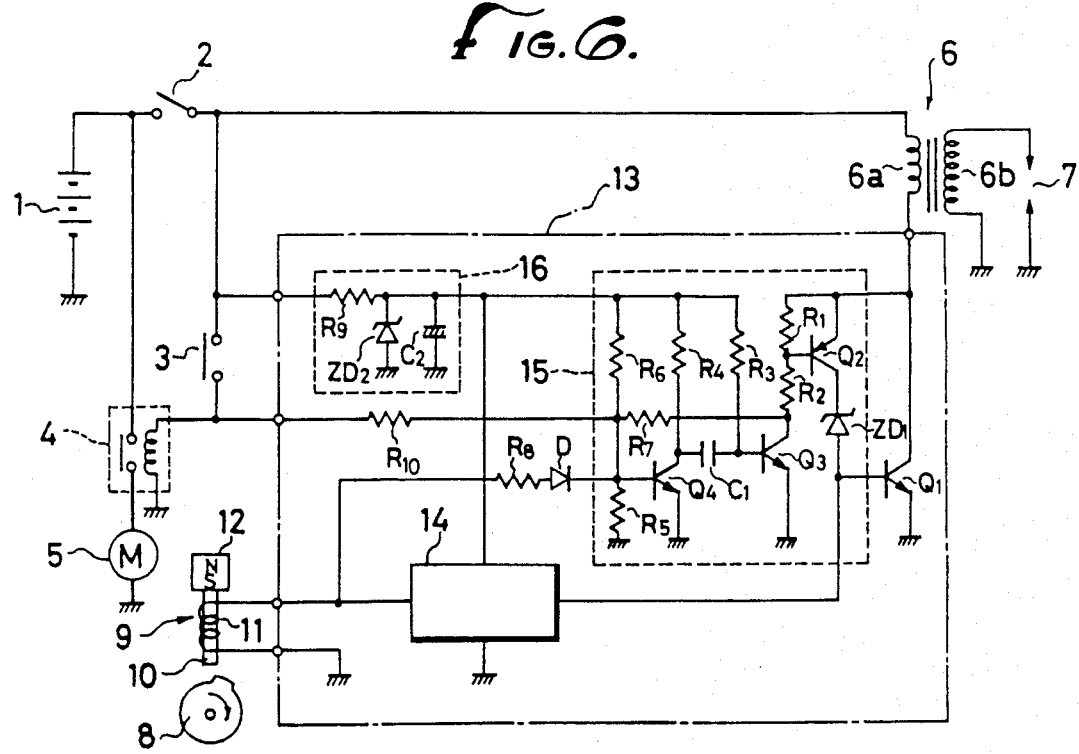
FIG. 6 is a diagram of an alternate system to that of FIG. 1.

FIG. 6 illustrates a diagram of a system according to another embodiment of the present invention. In this embodiment an output from starter switch 3 is applied through a resistor $R_{10}$ to the base of transistor $Q_4$. Except for this change, the remaining part of the system is the same as shown in FIG. 1. According to this embodiment, the starter signal of the battery voltage is applied, due to the ON condition of starter switch 3, to the base of transistor $Q_4$, and, irrespective of the high or low speed of the engine, transistor $Q_4$ becomes conductive and transistor $Q_3$ is turned OFF. Therefore, $Q_2$ is off and the low speed of the engine during starting of the engine does not adversely affect the ignition.

As has been explained above, according to the foregoing embodiments of the present invention, the ignition system is designed so that, irrespective of the fact that the ignition control signal is generated, ignition is inibited when revolutions of the engine are below a certain number which is lower than the idle speed of the engine. When, therefore, the speed of the engine is extremely low, e.g., during stopping, the crankshaft continues to rotate smoothly and shaking of the car during stopping is prevented.

Turning now to the further embodiment of FIG. 7, the same reference numerals designate like parts of FIG. 1, e.g., 1 is a battery, 2 is a main switch, 3 is a starter switch, and so on.

As in the prior circuits, reference numeral 13 designates an ignition circuit. This circuit comprises the ignition control circuit 14 which generates an ignition control signal on the basis of timing pulses a and b, the power transistor $Q_1$ is connected in series with the primary winding 6a of ignition coil 6 and generates high voltage on a secondary winding 6b of ignition coil 6 by being switched off in response to the ignition control signal, and the power source 16. The inhibit circuit 15 differs from that of FIG. 1 as will appear subsequently. This circuit 15, irrespective of the moment of generation of negative timing pulse b at a certain time in the engine starting period, e.g., when starter switch 3 is switched off, suppresses the generation of the ignition control signal and inhibits the occurrence of an ignition spark on spark plug 7.

Figure 2:
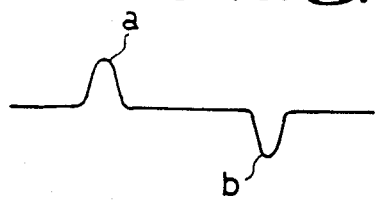
FIG. 2 is a waveform of an output signal of a pulser coil shown in FIG. 1.
Figure 3:
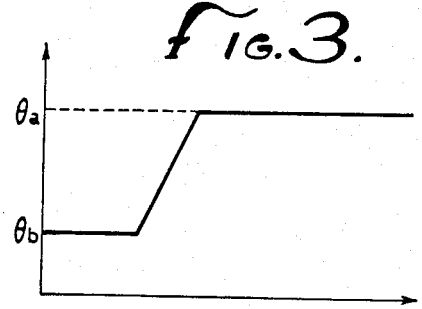
FIG. 3 shows ignition advance characteristics.

In inhibit circuit 15 of FIG. 7, a transistor $Q_2$ and a Zener diode $ZD_1$ are connected in series between the collector and base of a power transistor $Q_1$. The Zener diode $ZD_1$ has a Zener voltage Vz, e.g., of 18 V, which is above the output voltage of power source 16 so that it is normally non-conductive. Resistors $R_1$, $R_2$ and a transistor $Q_3$ are connected as in FIG. 1. The base of transistor $Q_3$ is connected to ground through a resistor $R_{11}$, and to an output terminal of the starter switch 3 through resistors $R_{12}$, $R_{13}$ and $R_{14}$. The point of interconnection of resistors $R_{12}$ abd $R_{13}$ is connected to an output terminal of the pulser coil 11 through a resistor $R_{15}$ and a diode $D_1$. A Zener diode $ZD_3$ is arranged between ground and a point of interconection of resistors $R_{13}$ and $R_{14}$. In this circuit when the starter switch 3 is ON, the starter signal obtained from the battery voltage is converted into a constant voltage through resistor $R_{14}$ and Zener diode $ZD_3$, and is applied to pulser coil 11 through resistors $R_{13}$ and $R_{15}$. The voltage obtained in this manner at voltage division point (A) is applied through resistor $R_{12}$ to the base of transistor $Q_3$. When, however, a negative timing pulse b as shown in FIG. 2 (e.g. $-0.5$ V) is generated on pulser coil 11, the transistor $Q_3$ is OFF.

The system of the further embodiment of FIG. 7 of the present invention operates in the following manner.

Normally, the ignition control circuit 14 generates an ignition control signal of the type shown in FIG. 8(b) which corresponds to a pulser output shown in FIG. 8(a). By means of timing which reduces this ignition control signal (b) from a high level to a low level, i.e., by means of timing which transforms power transistor $Q_1$ from the ON state to the OFF state, an extremely high counter electromotive force shown in FIG. 8(c) is induced on primary winding 6a of ignition coil 6 so that a high voltage which is a multiple of the turn ratio of secondary winding 6b and primary winding 6a to secondary winding 6b is generated, whereby a spark discharge occurs on ignition plug 7.

When the starter switch 3 is in the ON position during the starting of the engine, then, apart from the case of negative pulser output "b", transistor $Q_3$ in inhibit circuit 15 assumes the ON state and transistor $Q_2$ is also in the ON condition. If the engine is now started under a condition when the capacity of the battery 1 is very low, then in contrast to the pulser output "a" and because of a temporary decrease in accuracy (FIG. 9), apart from the case of a positive timing, an ignition control signal FIG. 8(b) will be generated from ignition control circuit 14. Due to this action and by means of an ignition timing which transfers the ignition control signal 8(b) from a high level to a low level, power transistor $Q_1$ triggers into the ON condition. At this moment, a counter electromotive force of ignition coil 6 is applied to the collector of power transistor $Q_1$. Because this voltage, however, returns back to the base of power transistor $Q_1$ through transistor $Q_2$ and Zener diode $ZD_1$, the collector voltage 8(c) of power transistor $Q_1$, i.e., the primary voltage of ignition coil 6, is almost suppressed by Zener voltage Vz of Zener diode $ZD_1$. Therefore, the secondary voltage of ignition coil 6 is restricted to a low voltage and the spark discharge does not occur on ignition plug 7.

Since inhibition circuit 15 operates in accordance with the starter switch signal, it does not influence the ignition operation, except during the starting time.

As has been explained above, according to the further embodiment of FIG. 7, during a predetermined period of time and except for the moment of generation of a synchronizing signal (a negative timing pulse) which is synchronized with the engine rotation, the spark discharge on the ignition plug is prohibited irrespective of the generation of the ignition control signal. Therefore it is possible from the starting period to provide the optimum ignition timing, and especially to improve the accuracy of ignition when the engine is started under conditions of extremely low battery capacity.

While preferred embodiments of the present invention have been illustrated and described, modifications and variations thereof will be apparent to those skilled in the art given the teachings herein, and it is intended that all such modifications and variations be encompassed within the scope of the appended claims.

What is claimed is:

1. An ignition system for an internal combustion engine comprising
   electronic pick-up means for providing first and second pulses whose polarities are different from each other,
   ignition control circuit means for generating ignition pulses in response to said first and second pulses,
   ignition coil means for causing a spark discharge on a spark plug, said ignition coil means having a primary winding,
   power semiconductor means connected with said primary winding and being responsive to the ignition pulses from said ignition control circuit means for normally periodically providing signals to said primary winding for causing periodic spark discharges, and
   inhibit circuit means responsive to each first pulse from said electronic pick-up means for generating a constant time duration pulse in response to each said first pulse, and said inhibit circuit means including (a) switch circuit means cennected with said power semiconductor means for allowing said power semiconductor means to apply said signals to said primary winding when said second pulse is within the period of a constant time duration pulse and (b) suppressing the signals applied to the primary winding of the ignition coil means by said power semiconductor means does not occur within the period of said constant time duration pulse so as to inhibit spark discharge when the speed of the engine is below a predetermined value which is lower than the normal idle speed of the engine.

2. An ignition system as in claim 1 wherein
   said power semiconductor means comprises a power transistor, and said switch circuit means of said inhibit circuit means comprises a zener diode and semiconductor switch means connected with said power transistor, said semiconductor switch means being (a) switched to one state during the period of said constant time duration pulse, and (b) switched to a second state after said period for inhibiting the signal applied by said power semiconductor means to said ignition coil means to thereby inhibit spark generation when said second pulse from said electronic pick-up means occurs outside of the period of said constant time duration pulse.

3. An ignition system for an internal combustion engine comprising
   electronic pick-up means for providing first and second spaced pulses wherein the spacing between said pulses is a function of the speed of the internal combustion engine with the spacing between said pulses being shorter at high speed and longer at low speed, ignition control circuit means responsive to pulses from said electronic pick-up means for generating ignition pulses ignition coil means for causing a spark discharge on a spark plug, said ignition coil means having a primary winding, power semiconductor means connected with said primary winding and being responsive to ignition pulses from said ignition control circuit means for normally providing signals to said primary winding for causing periodic spark discharges, and inhibit means responsive to each first pulse from said electronic pick-up means for generating a time duration pulse having a predetermined period in response to each said first pulse from said electronic pick-up means, and including circuit means connected with said power semiconductor means for allowing said power semiconductor means to provide said signals to said primary winding for causing periodic spark discharges when said second pulses from said electronic pick-up means occur within said predetermined period of respective time duration pulses, and said circuit means further inhibiting the generation of spark discharges by bypassing primary winding signals when the second pulses occur outside said predetermined period to thereby inhibit spark generation when the speed of the engine is below a predetermined value which is lower than the normal idle speed of the engine.

4. An ignition system as in claim 3 wherein said power semiconductor means comprises a power transistor, and said circuit means of said inhibit means comprises a zener diode and semiconductor switch means connected with said power transistor, said semiconductor switch means being (a) switched to one state during said predetermined period of said time duration pulse, and (b) switched to a second state after said predetermined period for inhibiting the signal applied by said power semiconductor means to said ignition coil means to thereby inhibit spark generation when said second pulse from said electronic pick-up means occurs outside of the predetermined period of said time duration pulse.

5. An ignition system for an internal combustion engine comprising electronic pick-up means for providing first and second spaced pulses wherein the spacing between said pulses is a function of the speed of the internal combustion engine with the spacing between said pulses being shorter at high speed and longer at low speed, ignition control circuit means responsive to pulses from said electronic pick-up means for generating ignition pulses, ignition coil means for causing a spark discharge on a spark plug, said ignition coil means having a primary winding, power semiconductor means connected with said primary winding and being responsive to the ignition pulses from said ignition control circuit means for periodically providing signals to said primary winding for causing periodic spark discharges, said signals provided to said primary winding resulting from said power semiconductor means transferring from an On state to an Off state, and inhibit means responsive to each first pulse from said electronic pick-up means for generating a timing pulse having a predetermined substantially constant duration, and including bypass switch means connected with the primary winding of said ignition coil means for bypassing signals through said primary winding past said power semiconductor means for inhibiting the generation of periodic spark discharges, said bypass switch means being turned Off during said duration of said timing pulse to allow said periodic spark discharges to be generated if said second pulses from said electronic pick-up means occur within said duration of said timing pulse, and said bypass switch means being turned On after the duration of said time pulse to bypass primary winding signals for thereby suppressing spark discharges when the speed of the engine is below a predetermined value which is lower than the normal idle speed of the engine.

6. An ignition system for an internal combustion engine comprising electronic pick-up means for providing first and second spaced pulses wherein the spacing between said pulses is a function of the speed of the internal combustion engine, and wherein the spacing between said pulses is shorter at high speed and longer at low speed, ignition control circuit means responsive to pulses from said electronic pick-up means for generating ignition pulses, ignition coil means for causing a spark discharge on a spark plug, said ignition control means having a primary winding, power semiconductor means connected with said primary winding and being responsive to the ignition pulses from said ignition control circuit means for periodically changing state to cause said ignition coil means to initiate periodic spark discharges when said power semiconductor means changes from one predetermined state to another, and inhibit circuit means responsive to each first pulse from said electronic pick-up means for generating a timing pulse having a predetermined substantially constant duration, and including bypass switch means connected with the primary winding of said ignition coil means and said power semiconductor means for bypassing signals, normally occurring through said primary winding when said power semiconductor means changes from said one predetermined state to another, past said power semiconductor means for thereby inhibiting the generation of periodic spark discharges when the speed of the engine is below a predetermined value which is lower than a predetermined normal speed of the engine, said bypass switch means including a semiconductor switch being turned to one predetermined state during said duration of said timing pulse to allow said periodic spark discharge to be generated if said second pulse from said electronic pick-up means occurs within said duration of said timing pulse, and said semiconductor switch being turned to a second predetermined state after the duration of said timing pulse to provide a bypass circuit around said power semiconductor means if said second pulse does not occur within the duration of said timing pulse for thereby suppressing a spark discharge.

* * * * *